· US007393384B2

United States Patent
Gopalan et al.

(10) Patent No.: US 7,393,384 B2
(45) Date of Patent: Jul. 1, 2008

(54) HYDROGEN SEPARATION USING OXYGEN ION-ELECTRON MIXED CONDUCTION MEMBRANES

(75) Inventors: Srikanth Gopalan, Westborough, MA (US); Uday Pal, Dover, MA (US)

(73) Assignee: The Trustees of Boston University, Boston, MA (US)

( * ) Notice: Subject to any disclaimer, the term of this patent is extended or adjusted under 35 U.S.C. 154(b) by 305 days.

(21) Appl. No.: 10/511,644

(22) PCT Filed: Apr. 15, 2003

(86) PCT No.: PCT/US03/11166

§ 371 (c)(1), (2), (4) Date: Oct. 18, 2004

(87) PCT Pub. No.: WO03/089117

PCT Pub. Date: Oct. 30, 2003

(65) Prior Publication Data

US 2005/0252372 A1   Nov. 17, 2005

Related U.S. Application Data

(60) Provisional application No. 60/373,531, filed on Apr. 18, 2002.

(51) Int. Cl.
  *B01D 53/22* (2006.01)
  *B01D 71/02* (2006.01)
(52) U.S. Cl. ............... 95/55; 95/43; 95/56; 96/7; 96/10; 96/11; 429/17; 423/648.1; 423/650

(58) Field of Classification Search ............... 95/43, 95/55, 56; 96/4, 7, 10, 11; 429/13, 17; 423/648.1, 423/650
See application file for complete search history.

(56) References Cited

U.S. PATENT DOCUMENTS 3,450,500 A   6/1969   Setzer et al.

(Continued)

FOREIGN PATENT DOCUMENTS

WO   WO-96/09360   3/1996

(Continued)

OTHER PUBLICATIONS

Demin et al., "Transfer Phenomena in an Electrochemical Reactor Based on Mixed Oxide Conductor", Solid State Ionics, vol. 135, pp. 749-755, (2000).

(Continued)

*Primary Examiner*—Jason M. Greene
(74) *Attorney, Agent, or Firm*—Wilmer Cutler Pickering Hale & Dorr LLP (57) ABSTRACT

A process for purification of hydrogen from a stream of synthesis gas or other reformate gases is described. The process, generally conducted at temperatures of approximately 800-1000° C., involves the use of a cell in which a mixture of reformate gas and steam are flowed on one side of a dense solid state ceramic membrane, while steam is passed on the other side. High purity hydrogen is generated on the steam side. The membrane is similar to one that has in the past been used for oxygen purification and can be single or two phase, for example $La_{0.9}Sr_{0.1}Ga_{0.8}Mg_{0.2}O_3$+Pd.

12 Claims, 4 Drawing Sheets

U.S. PATENT DOCUMENTS

| | | | |
|---|---|---|---|
| 3,901,668 A | 8/1975 | Seitzer | |
| 4,019,868 A | 4/1977 | Sebacher et al. | |
| 4,120,663 A | 10/1978 | Fally | |
| 4,254,086 A | 3/1981 | Sanders | |
| 4,810,485 A | 3/1989 | Marianowski et al. | |
| 5,217,506 A * | 6/1993 | Edlund et al. | 95/56 |
| 5,306,411 A | 4/1994 | Mazanec et al. | |
| 5,447,555 A | 9/1995 | Ye et al. | |
| 5,509,362 A | 4/1996 | Lyon | |
| 5,852,925 A * | 12/1998 | Prasad et al. | 95/55 |
| 6,033,632 A | 3/2000 | Schwartz et al. | |
| 6,066,307 A * | 5/2000 | Keskar et al. | 423/648.1 |
| 6,146,549 A | 11/2000 | Mackay et al. | |
| 6,153,163 A * | 11/2000 | Prasad et al. | 423/246 |
| 6,165,553 A | 12/2000 | Chen et al. | |
| 6,235,417 B1 * | 5/2001 | Wachsman et al. | 95/56 |
| 6,296,687 B2 * | 10/2001 | Wachsman et al. | 95/55 |
| 6,468,684 B1 | 10/2002 | Chisholm et al. | |
| 6,471,921 B1 | 10/2002 | Van Calcar et al. | |
| 6,541,159 B1 | 4/2003 | Li et al. | |
| 6,565,632 B1 * | 5/2003 | van Hassel et al. | 95/55 |
| 6,569,226 B1 | 5/2003 | Dorris et al. | |
| 6,641,626 B2 | 11/2003 | Van Calcar et al. | |
| 6,677,070 B2 | 1/2004 | Kearl | |
| 6,726,893 B2 * | 4/2004 | Lee et al. | 95/55 |
| 6,869,722 B2 | 3/2005 | Kearl | |
| 6,896,992 B2 | 5/2005 | Kearl | |
| 7,001,446 B2 * | 2/2006 | Roark et al. | 95/56 |
| 2003/0037488 A1 | 2/2003 | Van Calcar et al. | |
| 2003/0143440 A1 | 7/2003 | Tao et al. | |
| 2004/0091609 A1 | 5/2004 | Kearl | |
| 2004/0101729 A1 | 5/2004 | Kearl | |
| 2004/0202924 A1 | 10/2004 | Tao et al. | |
| 2005/0194571 A1 * | 9/2005 | Elangovan et al. | 252/500 |

FOREIGN PATENT DOCUMENTS

| | | |
|---|---|---|
| WO | WO-96/33794 | 10/1996 |
| WO | WO-00/69556 | 11/2000 |
| WO | WO-01/10775 | 2/2001 |
| WO | WO-02/087002 | 10/2002 |

OTHER PUBLICATIONS

Gong et al., "Polarization Study on Doped Lanthanum Gallate Electrolyte Using Impedance Spectroscopy", Journal of Materials Engineering and Performance, vol. 13, No. 3, pp. 274-281 (Jun. 2004).

Jiang et al., "The Electrochemical Performance of LSM/Zirconia-Yttria Interface as a Function of A-Site Non-Stoichiometry and Cathodic Current Treatment", Solid State Ionics, vol. 121, pp. 1-10.

Martinez-Frias et al., "A Natural Gas-Assisted Steam Electrolyzer for High Efficiency Production of Hydrogen", International Journal of Hydrogen Energy, vol. 28, pp. 483-490 (2003).

Mizusaki et al., "Kinetic Studies of the Reaction at the Nickel Pattern Electrode on YSZ in $H_2$-$H_2O$ Atmospheres", Solid State Ionics, vol. 70/71, pp. 52-58 (1994).

Petric et al., "Evaluation of La-Sr-Co-Fe-O Perovskites for Solid Oxide Fuel Cells and Gas Separation Membranes", Solid state Ionics, vol. 135, pp. 719-725 (2000).

S. Primdahl and M. Mogensen, "Oxidation of Hydrogen on Ni/Yttria-Stabilized Zirconia Cermet Anodes", J. Electrochem. Soc., vol. 144, No. 10, pp. 3409-3419 (Oct. 1997).

Wang et al., "Electrocatalytic Properties of $La_{0.9}Sr_{0.1}MnO_3$-Based Electrodes for Oxygen Reduction", J. Solid State Electroshem, vol. 6, pp. 384-390 (2002).

* cited by examiner

HYDROGEN SEPARATION USING OXYGEN ION-ELECTRON MIXED CONDUCTION MEMBRANES

CROSS REFERENCE TO RELATED APPLICATIONS

This application claims priority to U.S. Provisional Application Ser. No. 60/373,531, filed Apr. 18, 2002, which is incorporated in its entirety herein.

STATEMENT REGARDING FEDERALLY SPONSORED RESEARCH OR DEVELOPMENT

N/A

BACKGROUND OF THE INVENTION

Proton exchange membrane (PEM) fuel cells are fast approaching commercialization for application in the transportation and stationary sectors. One of the needs for the operation of a PEM fuel cell is that of high purity hydrogen with less than ~10 ppm of impurities such as CO. It is therefore expected that if PEM fuel cells are to have wide applications, an infrastructure to produce tonnage quantities of high purity hydrogen has to be available.

Presently tonnage hydrogen is produced by reformation of hydrocarbon fuel followed by the water gas shift reaction and pressure swing adsorption (PSA) of the $CO_2$. The major disadvantage of the current process especially in reference to PEM fuel cell application is that the purity levels that can be attained are low (80-90%). Impurities such as CO and $CH_4$ remain in the hydrogen which can poison the anodes of the PEM fuel cell.

BRIEF SUMMARY OF THE INVENTION

A process for purification of hydrogen from a stream of synthesis gas or other reformate gases is described. The process, generally conducted at temperatures of approximately 800-1000 C, involves the use of a cell in which a mixture of reformate gas and steam are flowed on one side of a dense solid state ceramic membrane, while steam is passed on the other side. High purity hydrogen is generated on the steam side. The membrane is similar to one that has in the past been used for oxygen purification and can be single or two phase, for example $La_{0.9}Sr_{0.1}Ga_{0.8}Mg_{0.2}O_3$+Pd.

DETAILED DESCRIPTION OF THE INVENTION

This invention relates to the purification of hydrogen from synthesis gas (or syn gas) or other hydrogen containing reformates, which are mixtures of carbon monoxide and hydrogen in varying proportions.

There is a need for an inexpensive process for obtaining high-purity hydrogen gas (generally containing less than 10 ppm of carbon monoxide) that can be used in fuel cells for motor vehicles and other applications.

The raw material costs for this process are similar to that of pressure swing adsorption (PSA). The main economic benefit arises from the purity level of the end-product, namely hydrogen. Purity levels very close to 100% can be achieved using this process. The process is net endothermic with a net energy requirement of 272 kWh/MMBTU of $H_2$. At energy cost of 5 cents/kWh this results in a cost of $13.60/MMBTU of $H_2$. The range of $H_2$ cost depending on process and purity levels range from $8 to $50/MMBTU of $H_2$ with the lower end corresponding to steam methane reformation followed by PSA and the higher end corresponding to electrolysis. Thus the cost of the process disclosed here is comparable to conventional processes while resulting in a much higher purity level.

Syn gases are generated by the partial oxidation of methane (also known as the POX reaction).

Alternatively, syn gases can be generated by using the steam methane reformation (SMR) process, in which the following reaction takes place:

Although most of the discussion herein relates to the reformate containing carbon monoxide plus hydrogen, this process also applies to these mixtures that contain other by-products from the partial oxidation or steam reformation of methane. Furthermore, the process can be used with mixtures of carbon monoxide and hydrogen containing small quantities of other hydrocarbons or hydrocarbon reformate or inert gases such as Ar, He or nitrogen. In addition, the process also applies to the partial oxidation or steam methane reformation products of other hydrocarbons (such as propane, butane, octane, or mixtures thereof). The process is also applicable to the products of carbon dioxide reformation of hydrocarbons and autothermal reformation of hydrocarbons (including methane). Mixtures of any 2 or more of the above gases can also be used.

The gases used in this process as a source of hydrogen can be not only syn gas, but also (1) any gaseous mixtures containing hydrogen gas, (2) similar materials not in a gaseous state at room temperature but which can be converted to a gaseous state at the temperature and pressure at which the separation takes place, and (3) any mixtures thereof.

The reformation of methane is typically conducted using a steam reformation reaction, which utilizes a very large, capital intensive piece of equipment.

Figure 1A:
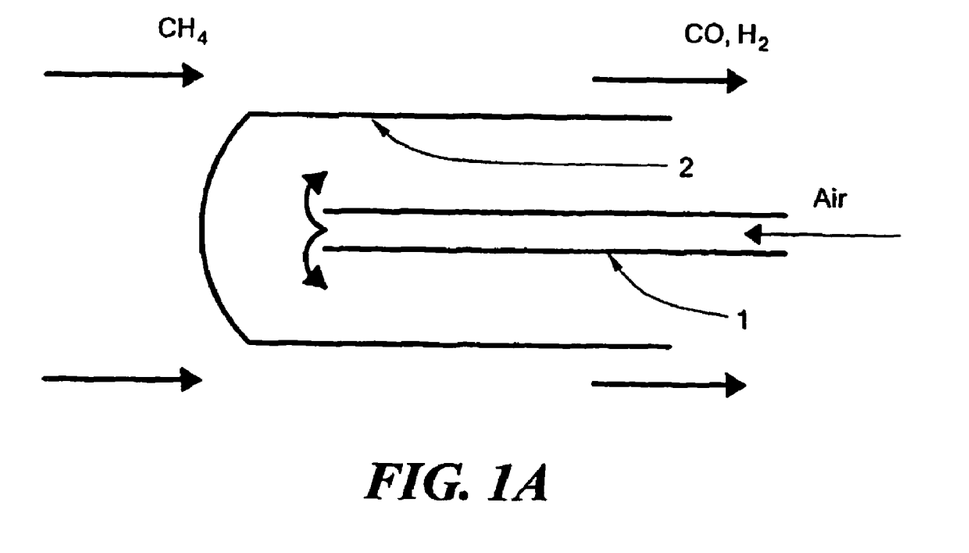
FIG. 1A represents a schematic showing the process for oxygen purification and preparation of syn gas.

More recently, a process for oxygen purification has been developed which utilizes a tubular form of a membrane, such as that shown schematically in FIG. 1. (See also, for example, the apparatus used in U.S. Pat. No. 5,447,555.) The type of membrane used for oxygen purification is a mixed oxygen ion and electron conducting perovskite, for example $La_{0.8}Sr_{0.2}Fe_{0.7}CO_{0.3}O_3$. The oxygen produced by this process can either be isolated from the system (for example by creating a vacuum on the other side of the membrane) or can be used to react with methane to form syn gases (as shown in FIG. 1).

Figure 1B:
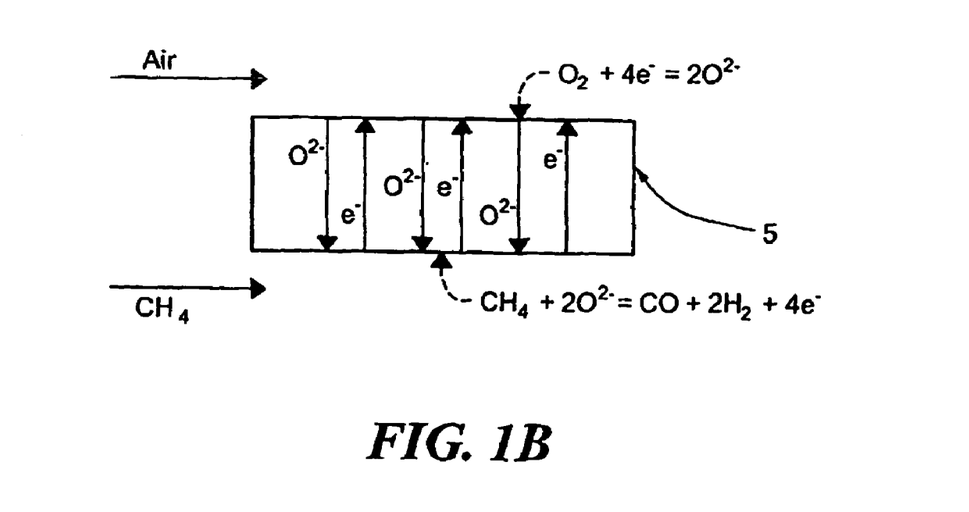
FIG. 1B shows the transfer of oxygen ions and electrons through the membrane.

To produce syn gas via this method, air is injected through a tube 1 into the closed end of a tubular membrane 2 and releases oxygen ions which combines with the methane to form syn gas (carbon monoxide and hydrogen). The electrons released from syn gas formation pass through the membrane in the opposite direction and are used to create the oxygen ions. The temperature of the process is high enough so that the oxygen is reduced to oxygen ions and the oxygen ions back to oxygen by electrocatalysis when contacted with the two membrane surfaces. FIG. 1B shows a representative cross section of the membrane. The membrane 5 and transfer of $O^{2-}$ and electrons across the membrane is shown.

A similar process has been investigated for separation of hydrogen, except that a different membrane composition (doped-$BaCeO_3$+metal (e.g. Nickel) is used. (See, for example, Wachsman, U.S. Pat. No. 6,296,687.) This membrane conducts hydrogen ions (or protons) and electrons. Syn gas (or another reformate gas containing hydrogen) mixed with steam is passed into a tubular membrane under high pressure (e.g., 5-10 atm) to obtain pure hydrogen. On the pressurized side of the membrane the carbon monoxide reacts with steam through the following reaction:

$$CO + H_2O \rightarrow H_2 + CO_2$$

which is also known as the water gas shift reaction (or WGS). The hydrogen already present in the syn gas (or other reformate) and the hydrogen formed from the WGS reaction are transported from the high pressure side to the low pressure side through ambipolar transport of protons and electrons. Thus the overall reaction is hydrogen (gas at high pressure, low purity) being transformed to hydrogen (gas at lower pressure, high purity) or $$H_2 \text{ (high pressure, low purity)} \rightarrow H_2 \text{ (low pressure, high purity)}$$

However, the membrane used in U.S. Pat. No. 6,296,687 has low proton conductivity (see data in following table), resulting in low flux for hydrogen gas from the process. Very high purity levels of hydrogen close to 100% can be achieved using this process. In addition, the membrane (the composition of which is doped-$BaCeO_3$) is unstable since, when exposed to $CO_2$ and steam at high temperatures, the membrane decomposed to $BaCO_3$ and $CeO_2$. (S. Gopalan and A. V. Virkar, "Thermodynamic Stabilities of $SrCeO_3$ and $BaCeO_3$ Using a Molten Salt Method and Galvanic Cells," *J. Electrochem. Soc.*, 140 [4] 1060-65 (1993). In the presence of water vapor in the atmosphere the doped $BaCeO_3$ in the membrane decomposes to $Ba(OH)_2$ and $CeO_2$. This contrasts with the membranes used in oxygen purification, where, since the field is more mature, the materials used in the membrane are more stable under the operating conditions of the gas separation processes.

Further, a dual phase membrane in which one phase is ionically conductive and the second electronically conductive can be used. The advantage of this approach is that stable materials are known and can be used for each phase. For example to achieve mixed oxygen ion and electron conduction using a dual phase membrane, yttria stabilized zirconia (YSZ) can be used for the oxygen ion conducting phase and Pd or Pt can be used for the electron conducting phase. YSZ is stable over a very wide range of oxygen partial pressures. Similarly Pt and Pd are also stable over a very wide range of oxygen partial pressures.

Table of Ionic Conductivity (Comparison at 800° C.)

| Material | Conductivity (S/cm) |
|---|---|
| Y—$BaCeO_3$ (proton conductor)[1] | 0.008 S/cm |
| $La_{(1-x)}Sr_xCo_yFe_{(1-y)}O_3$ (oxygen ion conductor)[2] | 80 S/cm |

[1]T. Hibino, K. Mizutani, T. Yajima and H. Iwahara, Solid State Ionics 57 (1992) 303-306
[2]N. Q. Minh and T. Takahashi, Science and Technology of Ceramic Fuel Cells, Elsevier (1995).

The present invention deals with using a membrane, similar to that previously used for oxygen gas and syn gas purification, for the purification of hydrogen gas. It was unexpected that this membrane would have any utility in the instant process, since it had been used to transport oxygen ions and electrons, which are not the components transported in the hydrogen purification reaction. In the field of ceramic mixed ionic and electronic conducting membranes in general, when separation of a particular gas phase species is desired, one of the requirements is that the membrane under consideration should have conductivity for the ionic form of the gaseous species. Thus if separation of oxygen is desired the membrane should have conductivity of oxygen ions; if separation of hydrogen is desired the membrane should have conductivity of protons. By contrast in the present invention a membrane that is conductive for oxygen ions and electrons (or electron holes) is utilized to obtain purified hydrogen. (Note: electroneutrality is preserved in the case of transfer of oxygen ions and electrons when the transfer of oxygen ions is opposite in direction to transfer of electrons. In the case of oxygen ions and electron-holes, transfer of both species is in the same direction to preserve electroneutrality.) If the hydrogen purification reaction is reconfigured, with steam being used on both sides of the membrane (i.e. mixtures of syn gas (or other hydrocarbon reformate) and steam on one side and pure steam on the other side), the reactions are:

On the syn gas side: $CO + O^{2-} \rightarrow CO_2 + 2e^-$ $H_2 + O^{2-} \rightarrow H_2O + 2e-$ On the other side: $H_2O + 2e- \rightarrow H_2 + O^{2-}$ Oxygen ions formed through dissociation of steam through absorption of two electrons on the steam side transport to the syn-gas side where they combine with carbon monoxide and hydrogen in the syn gas to form carbon dioxide and steam and liberate two electrons. The liberated electrons transport through the same membrane in the opposite direction to the steam side to participate in the steam dissociation reaction. The gases exiting the steam side of the membrane contain a mixture of hydrogen and remnant water vapor. The water vapor present in this stream can be condensed in a condenser to result in a stream of pure hydrogen. (These reactions are discussed in more detail in relation to FIG. 3.) Further, if the steam formed on the syn gas side is continuously condensed to a level where carbon deposition does not occur in the membrane reactor, the reaction is forced to the right, resulting in a higher conversion of the syn gas to hydrogen. Although in most instances it may not be economically favorable to condense the steam mid-process on the syn gas side, in principle it can be achieved if higher conversion rates are desired.

The membranes used here are solid state ceramic membranes, which are very dense and non-flexible. Their thickness generally ranges from about 5-10 μm up to about 1-3 mm. These membranes separate components on the basis of ionic conductivity characteristics, not on the basis of molecular size. The temperature at which these membranes are effective are generally above 500 C, usually about 800-1000 C. The use of the solid state membranes improves the efficiency of the purification. If membranes are not used, thermodynamics of the reactions limit the purity level of hydrogen. However, using the membranes, the hydrogen can continuously be removed, resulting in the WGS reaction continuously shifting to the right. Thus, in principle very high purity levels can be achieved. The membranes used here are dense ceramic membranes that conduct both ionic and electronic species (also called MIECs). Techniques for making these types of membranes have been known. (See, for example, U.S. Pat. No. 5,306,411.) There are generally two types of membranes: single-phase and two-phase.

Single phase membranes are mixed conducting (i.e. conduct oxygen ion and electron holes.) Examples of these are oxides with the perovskite crystal structure. Specific examples include strontium doped lanthanum iron cobalt oxide of the composition $(La_{(1-x)}Sr_xCo_{(1-y)}Fe_yO_3$; where $0<x<1$ and $0<y<1$; with preferred composition range of $0<x<0.4$ and $0<y<1$). (These are also referred to as LSCF membranes.) Ca may also be used as the dopant instead of Sr, i.e. $La_{(1-x)}Ca_xCo_{(1-y)}Fe_yO_3$ $(0<x<1$ and $0<y<1)$. The site occupied by Co and Fe may also be substituted by Cr and Ni, i.e. $La_{(1-x)}Sr_xCo_{y1}Fe_{y2}Ni_{y3}Cr_{y4}O_3$ $(x<1, y1+y2+y3+y4=1)$.

LSCF membranes are already being developed for applications such as partial oxidation of methane (POX) to generate syn-gas. In the POX application, LSCF membranes are used in an atmosphere of air on feed side and methane on the permeate side. Oxygen transports via the ambipolar conduction mechanism to the permeate side where it combines with methane to form syn-gas which is a mixture of CO and $H_2$. One of the major barriers to commercialization of the membrane based POX technology has been the materials stability under the severe oxygen partial pressure gradients present in that application. The oxygen partial pressure gradients that will exist in the present hydrogen separation application are expected to be much smaller than the syn-gas application. Thus stability issues with respect to LSCF are much less of a concern in the method disclosed herein.

Another example of a single phase membrane possessing ionic and electronic conductivities is yttria stabilized zirconia (YSZ) doped with an oxide chosen from: $MnO_2$, $TiO_2$, FeO, $Cr_2O_3$ or other transition metal oxides. Yet another example is undoped $CeO_2$ or $CeO_2$ doped with an oxide chosen from $MnO_2$, $TiO_2$, FeO, $Cr_2O_3$ or other transition metal oxides.

In two-phase membranes, the concept is to separate the functions of ionic and electronic conduction. Any oxygen ion conductor and any metal can be chosen for this purpose. Examples are a two-phase mixture of YSZ (ionic conductor) and Pd (or one of Pt, Ni, Ag, Au). Another example is a mixture of $RE_2O_3$ doped $CeO_2$ (ionic conductor, where RE=Y, Yb, Sc, or Gd) and Pd (or one of Pt, Ni, Ag, Au). Other examples of two-phase mixed conductors Include LSGM $(La_{1-x}Sr_xMg_yGa_{1-y}O_3)$+Ni or LSGM+Pd. In the case of LSGM, stability is not expected to be a problem since it is already being developed as an electrolyte for solid oxide fuel cells (SOFCs) where highly oxidizing atmosphere (air) is expected to prevail on the cathode side and a highly reducing atmosphere ($H_2$ and/or CO) is expected to prevail on the anode side.

Other dense particulate composites of ionic conducting phases and electronically conducting phases can also be used. Mixtures of any 2 or more of the above membrane materials can also be used to fabricate the membrane.

The most preferred membranes for hydrogen purification are $La_{0.9}Sr_{0.1}Ga_{0.8}Mg_{0.2}O_3$+Pd. The most preferred ratio is 50% Pd and 50% $La_{0.9}Sr_{0.1}Ga_{0.8}Mg_{0.2}O_3$, although other ratios are possible. Thin membranes generally allow efficient transport across them. (The optimum thickness for the membranes used herein has been found to be approximately 5-10 microns (5-10 μM).) However, these membranes are quite fragile. However, as membranes get thicker, the membrane thickness influences the efficiency of transport of components across the membrane. (As the membrane gets thicker, there is more resistance to flow.) Therefore a smaller thickness is preferred to obtain higher fluxes. However for reasons of mechanical integrity the thickness of the membranes cannot be reduced indefinitely. One strategy used to achieve a thin membrane (5-100 microns) is to support the membrane using the same material with which the membrane itself was constructed, as was done in U.S. Pat. No. 5,447,555. The supports in such a case are fabricated with tailored porosity to allow for efficient gas transport and to increase the surface area for electrochemical reactions to occur.

Figure 2:
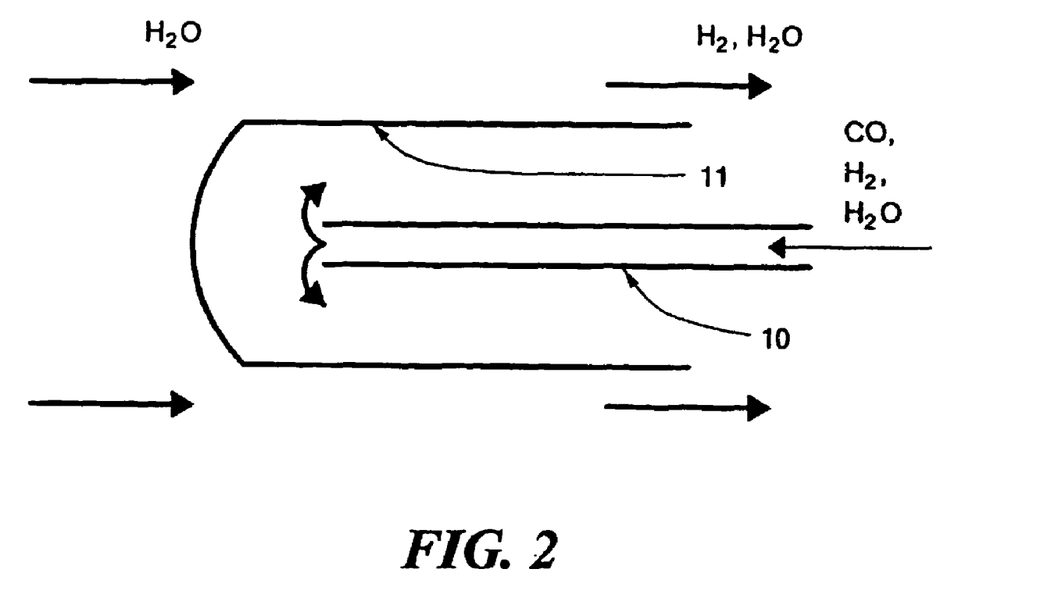
FIG. 2 represents a schematic showing the process for hydrogen purification.

It should be noted that the membrane used for hydrogen purification can be in any shape. One particularly convenient shape is shown in FIG. 2, which is tubular, with one end of the tube being closed. A tube 10 with a smaller diameter (made of any ceramic material that is conveniently available, for example alumina) than the membrane is inserted into the membrane 11 and carbon monoxide, hydrogen and steam are fed into the membrane. Water vapor is passed over the second side of the membrane. Because the syn gas is fed under pressure (approximately 5 to 30 atm), the reaction is forced towards the right, yielding purified hydrogen gas.

Figure 3:
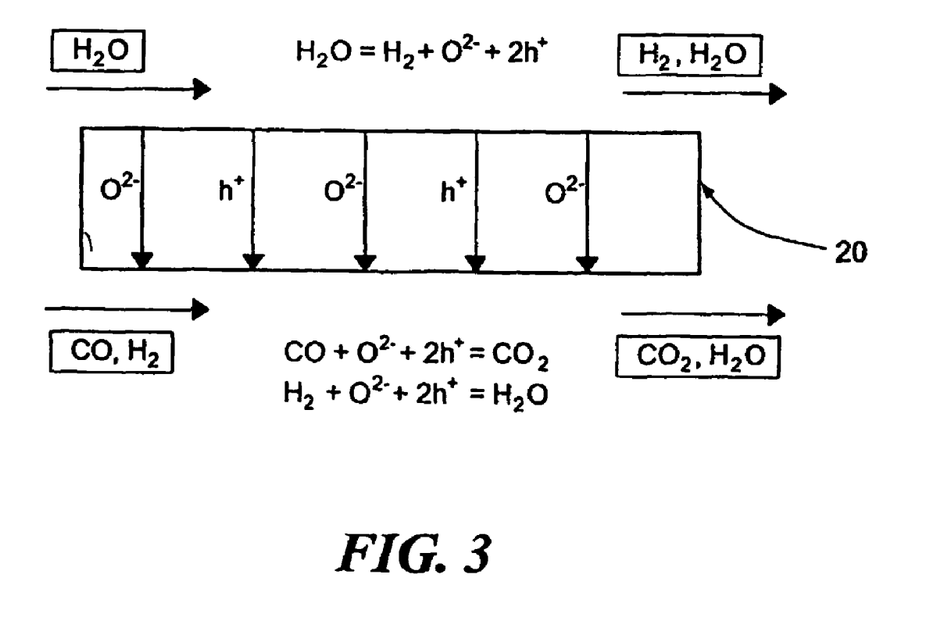
FIG. 3 shows the reactions during purification of hydrogen taking place on both sides of the membrane and the transfer of oxygen ions and electron holes through the membrane.

FIG. 3 shows the transfer across a representative section of the membrane. The membrane 20, and transfer of $O^{2-}$ and electron holes h+ across the membrane is shown. (Note that the flow of electron holes is opposite in direction to the flow of electrons.)

Note that the membranes used are generally bi-directional and that transfer of a component across the membrane is a function of concentration of that component on both sides of the membrane. As a result, a variation of FIG. 2, with steam passing into the inner tube (and passing over the inside of the membrane) and syn gas passing over the outside of the membrane, is also possible.

Figure 4:
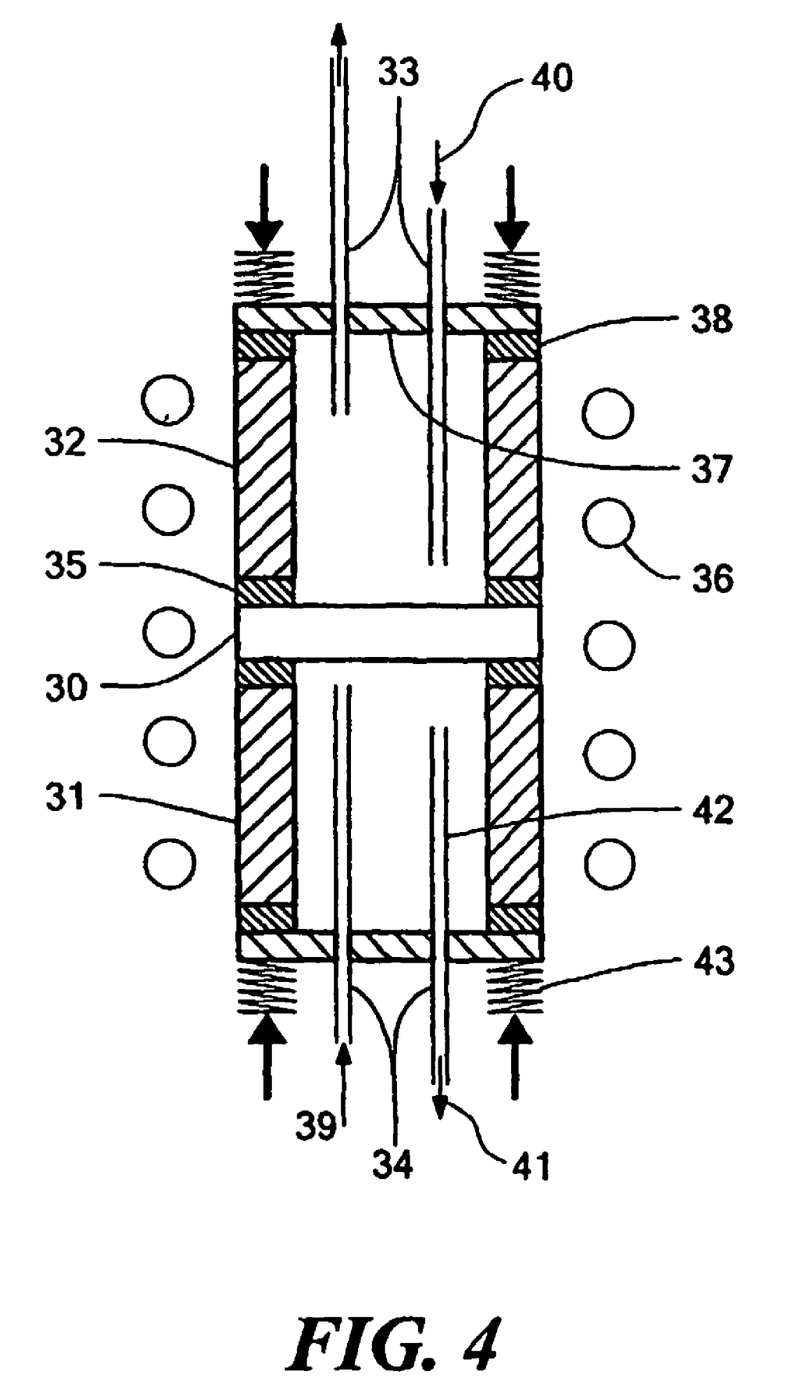
FIG. 4 shows a small-scale apparatus for conducting the process.

A bench scale apparatus is shown in FIG. 4. The membrane 30 is sealed between cut ends of two alumina tubes (31 and 32). Between the membrane and the ends of the tubes is placed an o-ring for sealing the membrane to the tubes. This frequently is a gold o-ring 35 that melts and forms the seal. A smaller diameter tube 33 is inserted into the syn gas side of the membrane (which is closed from the atmosphere with a stainless steel manifold 37) to carry the syn gas to the membrane, while the purified hydrogen gas is removed from the opposite side of the membrane via another tube 34. The entire apparatus is heated to 800-1000 C with furnace heating elements 36.

A larger scale apparatus for hydrogen purification is very similar to that used for oxygen purification, as shown in Schwartz, U.S. Pat. No. 6,033,632.

Figure 5:
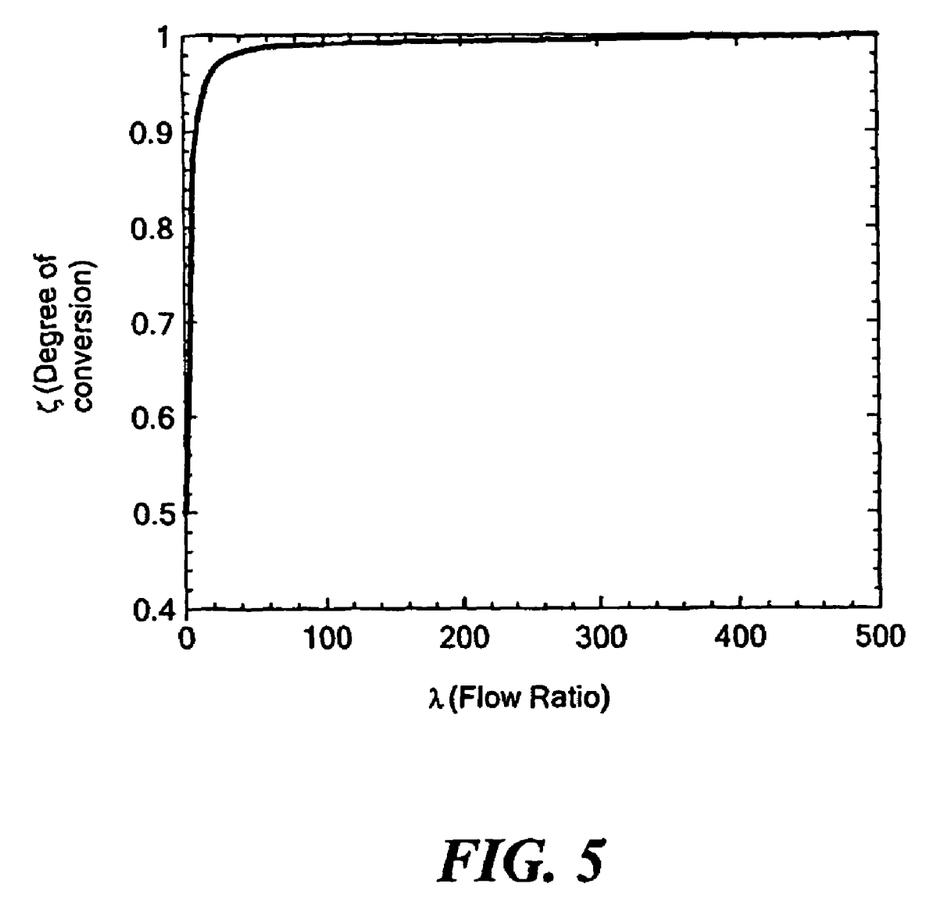
FIG. 5 shows the degree of conversion vs. flow ratio for the purification process for hydrogen described herein.

FIG. 5 shows the degree of conversion versus the flow ratio. The degree of conversion is the ratio of the hydrogen flow at the exit on the steam side of the membrane shown in FIG. 2 to the total flow of carbon monoxide and hydrogen introduced into tube 10 in FIG. 2. The flow ratio is the ratio of the total inlet steam on the steam side of FIG. 2 to the total flow of carbon monoxide and hydrogen introduced into tube 10 in FIG. 2.

Hydrogen on the steam side exit can be simply recovered by passing the steam and hydrogen mixture through a condenser and condensing the steam.

It is also possible to enhance the rate of hydrogen separation by partially condensing the steam formed on the syn gas side mid-process. Although this may not be economically favorable in principle it is possible to achieve further enhancements in hydrogen separation rates through this process.

Alternate processes for hydrogen purification utilize the sorption enhanced reaction, which yields hydrogen with much lower levels of purity (about 85-90%) than those obtained in the instant invention. The current process under development at companies such as APCI (Air Products and Chemicals Inc., Allentwon, Pa.) is called sorption enhanced reaction (SER). In this process hydrocarbons such as $CH_4$ are combined with large quantities of steam (e.g. 6:1 ratio) and reacted in a single tubular catalytic reactor wherein the steam reformation and water gas shift reactions are combined, i.e. $CH_4+2H_2O=4H_2+CO_2$. The resulting $CO_2$ gets adsorbed by an adsorbent placed within the same reactor. The major disadvantage of this process is that the purity level of the hydrogen tends to be only ~85-90% with majority impurity of $CH_4$. The present process after condensation of excess steam on the feed side results in close to 100% purity level for $H_2$. Further the ratio of steam to methane is very large, i.e. 6:1 with conversion ratios of only 59%. By contrast, even with a steam to fuel ratio of 3:1 the maximum theoretically obtainable conversion ratio in the present technique is 75%. However, this calculation assumes that there are no kinetic limitations such as surface exchange reactions etc. Even so, at a temperature of 900° C., the kinetic limitations are expected to be small.

The following examples are intended to illustrate, and not limit, the invention.

EXAMPLE 1

Building the Lab Scale Apparatus

The lab scale apparatus to measure hydrogen permeation fluxes is shown in FIG. 4. The membrane pellet is enclosed between two dense alumina tubes obtained from Coorstek ceramics in Golden, Colo. A gold wire obtained from Johnson Matthey is formed in the shape of a ring 35 and placed between the pellet sample 30 and the dense alumina tube (31 and 32). Stainless steel manifolds 37 are machined with ports (33 and 34) for inlet and exit gases. Silicone robber gaskets 38 are placed between the stainless steel manifolds and the alumina tube to create a gas tight seal. Alumina tubes 42 carry components into and out of the 2 chambers. Tho entire apparatus consists of the stainless steel manifold, silicon rubber gaskets, dense alumina tubes, gold o-rings and pellet sample, kept under moderate pressure using a spring loading mechanism 43.

During measurement, a mixture of Ar (carrier gas) and water vapor is fed into one side of the membrane through a port 39 machined into one of the stainless steel manifolds. Simulated syn gas containing $H_2$, CO, $H_2O$ is fed to the opposite membrane side through a port 40 machined into the other stainless steel manifold. By measuring the Ar and steam mixture flow rate and the gas that exits at the exit port 41 on this side of the membrane, the hydrogen permeation rate can be measured.

EXAMPLE 2

Making the $La_{0.9}Sr_{0.1}Ga_{0.8}Mg_{0.2}O_3$+Pd Membrane

To make $La_{0.9}Sr_{0.1}Ga_{0.8}Mg_{0.2}O_3$ membrane, initially precursors of lanthanum carbonate, strontium carbonate, gallium oxide and magnesium oxide are mixed in stoichiometric ratios and heated in a furnace in air in the temperature range of 1200-1400° C. for a period ranging from 10 minutes to a few days. The powders thus formed are then mechanically milled in a plastic bottle using ceramic milling media (example yttria stabilized zirconia) for a period (preferably one day) in an organic solvent (preferably isopropanol). The resulting finer particle size $La_{0.9}Sr_{0.1}Ga_{0.8}Mg_{0.2}O_3$ is well mixed with fine Pd powder obtained from Johnson Matthey. The resulting powder mixture is placed in a uniaxial die press and pressed into a pellet. The resulting pellet is then fired in the temperature range of 800-1400° C. to yield the $La_{0.9}Sr_{0.1}Ga_{0.8}Mg_{0.2}O_3$+Pd membrane pellet.

EXAMPLE 3

Making the LSCF Membrane

Synthesis of Powder to Form Membrane:

To make the LSCF powder, precursor powders of lanthanum carbonate, strontium carbonate, cobalt oxide and iron oxide of at least 99.5% purity obtained from Johnson Matthey are first mechanically mixed in appropriate stoichiometric proportions in a solvent of isopropanol. The mixed precursors are then heated in the temperature range of 1000-1600° C. to form the perovskite phase. The resulting powders are then milled down to a smaller particle size range preferably in the range of 0.01-5 microns.

Pellet Fabrication:

The powders synthesized above are then consolidated by pressing in a uniaxial die press where the powder is formed into a pellet shape by applying uniform uniaxial pressure (between 10,000 and 30,000 psi). The pressed powder is then densified by heating in a furnace (in the preferred temperature range of 1200 to 1700° C.) to form the dense membrane pellet.

Those with expertise in this area will recognize that variations of the above disclosure are within the scope of the invention.

What is claimed is:

1. A process for purifying hydrogen comprising:
   a. preparing a flow cell in which 2 gas flows are separated by an oxygen-ion conducting two-phase solid state membrane, wherein the first phase is ionically conducting and the second phase is electronically conducting,
   b. heating said cell to greater than 500° C.,
   c. passing a stream of reformate gases on one side of said membrane and steam on the second side of said membrane, wherein at least a portion of the steam on the second side of said membrane is reduced to produce purified hydrogen,
   d. separating said purified hydrogen from said second side of said membrane.

2. The process of claim 1 wherein said reformate gases are selected from the group consisting of:
   a) mixtures of carbon monoxide and hydrogen;
   b) mixtures of carbon monoxide and hydrogen containing small quantities of other hydrocarbons or hydrocarbon reformate or inert gases such as Ar, He or nitrogen;

c) by-products from the partial oxidation or steam reformation of methane;
d) partial oxidation or steam methane reformation products of other hydrocarbons;
e) products of carbon dioxide reformation of hydrocarbons;
f) products of autothermal reformation of methane and other hydrocarbons; and mixtures thereof.

3. The process of claim 1 wherein the first phase of said membrane is selected from the group consisting of:
$La_{(1-x)}Ca_xCo_{(1-y)}Fe_yO_3$, where $0<x<1$ and $0<y<1$;
$La_{(1-x)}Sr_xCo_{y1}Fe_{y2}Ni_{y3}Cr_{y4}O_3$, where $x<1$ and $y1+y2y3y4=1$;
yttria stabilized zirconia doped with an oxide selected from the group consisting of $MnO_2$, $TiO_2$, FeO, $Cr_2O_3$ and other transition metal oxides;
undoped $CeO_2$;
$CeO_2$ doped with an oxide selected from the group consisting of $MnO_2$, $TiO_2$, FeO, $Cr_2O_3$ and other transition metal oxides;
$RE_2O_3$ doped $CeO_2$, where RE is Y, Yb, Sc, or Gd; and
$La_{1-x}Sr_xMg_yGa_{1-y}O_3$, where $x<1$, $y<1$, and mixtures thereof.

4. The process of claim 1, wherein the first phase of said membrane is , where $0<x<0.4$ and $0<y<1$.

5. The process of claim 1, wherein said membrane is $La_{0.9}Sr_{0.1}Ga_{0.8}Mg_{0.2}O_3+Pd$.

6. The process of claim 1, wherein the second phase of said membrane is a metal selected from the group consisting of Pd, Pt, Ni, Ag and Au.

7. The process of claim 3, wherein the second phase of said membrane is a metal selected from the group consisting of Pd, Pt, Ni, Ag and Au.

8. The process of claim 1, wherein the said membrane comprises:
a first phase comprising one or more of yttria stabilized zirconia doped with an oxide selected from the group consisting of $MnO_2$, $TiO_2$, FeO, $Cr_2O_3$ and other transition metal oxides, $RE_2O_3$ doped $CeO_2$, where RE is Y, Yb, Sc, or Gd, and $La_{1-x}Sr_xMg_yGa_{1-y}O_3$, where $x<1$, $y<1$; and
a second phase comprising one or more of a metal selected from the group consisting of Pd, Pt, Ni, Ag and Au.

9. The process of claim 1, further comprising including a small amount of hydrogen with the heated steam.

10. The process of claim 9, wherein steam is present in the heated steam in an amount less than or equal to about 3 wt %.

11. A system for purifying hydrogen gas, comprising:
a source of reforming gas,
a source of steam,
a flow cell comprising a first oxidizing compartment and a second reducing compartment separated by a two-phase solid state membrane, wherein the first phase is oxygen-ion conducting and the second phase is electronically conducting,
means for directing the reforming gas across the membrane in the first compartment,
means for directing the steam across the membrane in the second compartment, wherein at least a portion of the steam directed across the membrane in the second compartment is reduced to produce purified hydrogen, and,
a condenser downstream from the second compartment for separating steam from hydrogen.

12. A process for purifying hydrogen comprising:
a. preparing a flow cell in which 2 gas flows are separated by an oxygen-ion conducting solid state membrane selected from the group consisting of:
$La_{(1-x)}Ca_xCo_{(1-y)}Fe_yO_3$, where $0<x<1$ and $0<y<1$;
, where $x<1$ and $y1+y2+y3+y4=1$;
yttria stabilized zirconia doped with an oxide selected from the group consisting of $MnO_2$, $TiO_2$, FeO, $Cr_2O_3$ and other transition metal oxides;
undoped $CeO_2$;
$CeO_2$ doped with an oxide selected from the group consisting of $MnO_2$, $TiO_2$, FeO, $Cr_2O_3$ and other transition metal oxides;
$RE_2O_3$ doped $CeO_2$, where RE is Y, Yb, Sc, or Gd; and
$La_{1-x}Sr_xMg_yGa_{1-y}O_3$, where $x<1$, $y<1$, and mixtures thereof,
b. heating said cell to greater than 500° C.,
c. passing a stream of reformate gases on one side of said membrane and steam on the second side of said membrane, wherein at least a portion of the steam on the second side of said membrane is reduced to produce purified hydrogen,
d. separating said purified hydrogen from said second side of said membrane.

* * * * *